Dec. 2, 1930.                E. J. LEACH                1,783,730
                          THERMOSTATIC VALVE
                        Filed March 28, 1927        2 Sheets-Sheet 1

Inventor
Edgar J. Leach
By Frank E. Liverance, Jr.
Attorney.

Dec. 2, 1930.                E. J. LEACH                1,783,730
                           THERMOSTATIC VALVE
                         Filed March 28, 1927        2 Sheets-Sheet 2
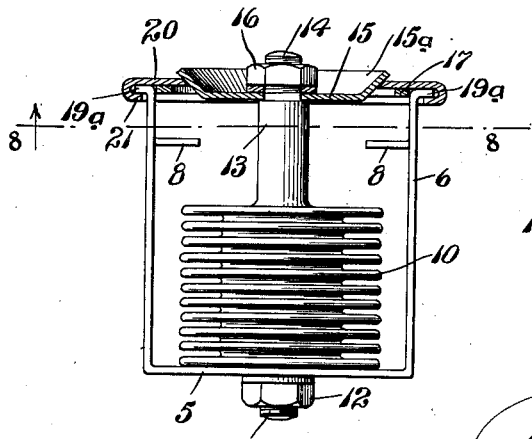
Fig. 7.
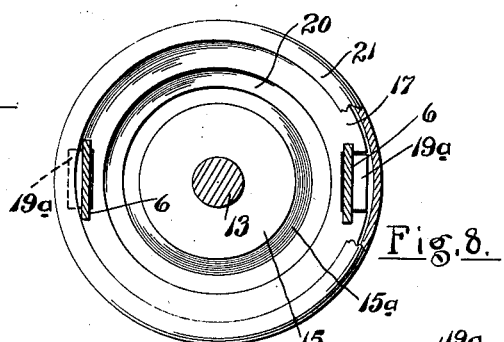
Fig. 8.
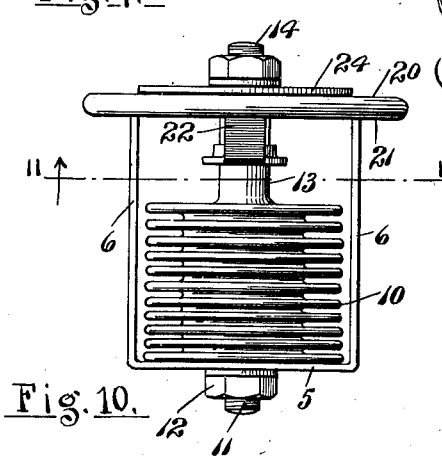
Fig. 10.
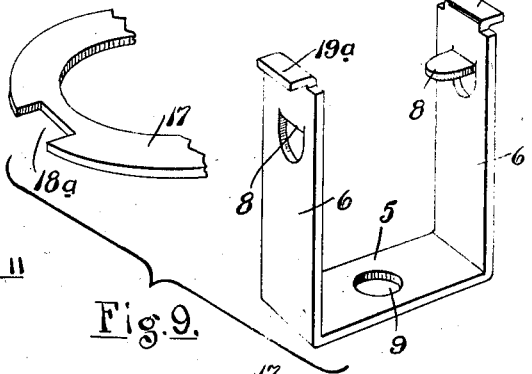
Fig. 9.
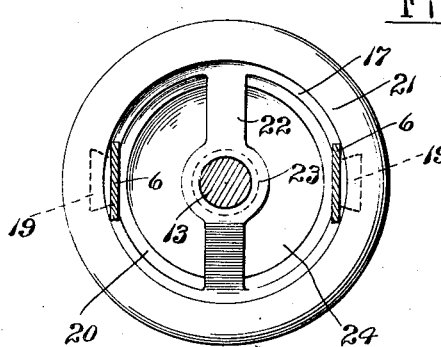
Fig. 11.
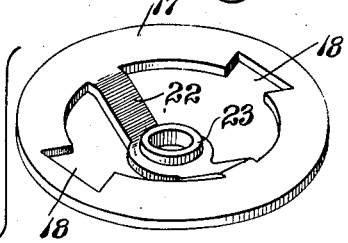
Fig. 12.
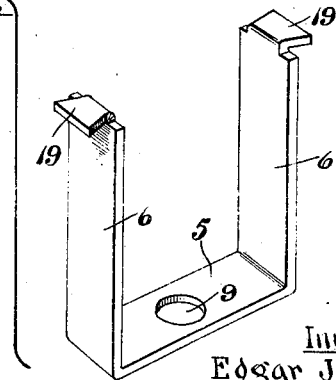
Inventor
Edgar J Leach
By
Frank E. Liverman jr
Attorney.

Patented Dec. 2, 1930

1,783,730

UNITED STATES PATENT OFFICE

EDGAR J. LEACH, OF JANESVILLE, WISCONSIN, ASSIGNOR TO TIME-O-STAT CONTROLS COMPANY, OF ELKHART, INDIANA, A CORPORATION OF MARYLAND

THERMOSTATIC VALVE

Application filed March 28, 1927. Serial No. 178,824.

This invention relates to thermostatic valves and is primarily concerned with a simple and economical construction of thermostatically operated valve which is opened and closed by the expansion and contraction of a bellows of corrugated sheet metal. Devices of this character are placed in the water circulation of a motor vehicle between the engine and the radiator the valve in closed position stopping water circulation from the engine to the radiator and opening as the water around the engine becomes heated to a predetermined degree of temperature.

For an understanding of the invention reference may be had to the following description, taken in connection with the accompanying drawings, in which, Fig. 1 is a partial section and side elevation of one form of construction embodying my invention.

Fig. 7 is a view similar to that shown in Figs. 1 and 4, illustrating a still further form of the invention.

Fig. 8 is a horizontal section on the plane of line 8—8 of Fig. 7, looking in the direction indicated.

Fig. 9 is a perspective view, similar to that shown in Fig. 6, illustrating the same elements as they are changed in the form shown in Fig. 7.

Fig. 10 is an elevation showing the form illustrated in Fig. 4 modified to provide a guide for the valve stem.

Fig. 11 is a horizontal section on the plane of line 11—11 of Fig. 10, looking in the direction indicated by the arrows, and Fig. 12 illustrates, in perspective, the same two elements which are shown in Fig. 6 modified in accordance with the changes made.

Like reference characters refer to like parts in the different figures of the drawings.

Figure 1:
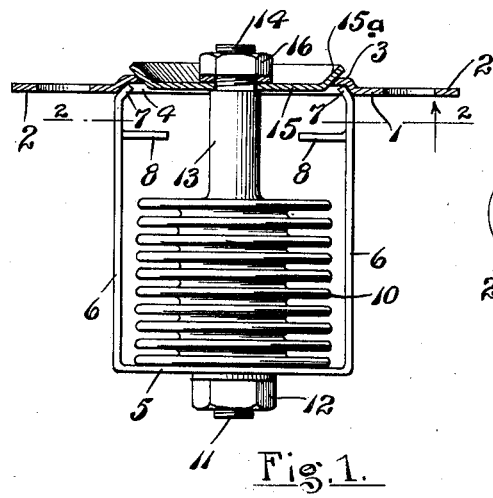
Figure 2:
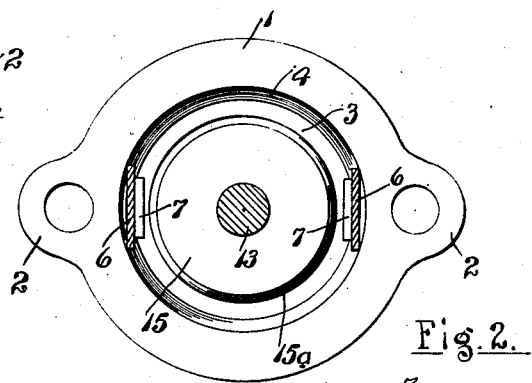
Fig. 2 is a section taken on the plane of line 2—2 of Fig. 1, looking in the direction indicated.
Figure 3:
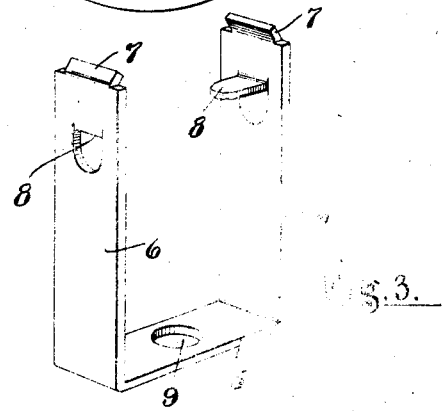
Fig. 3 is a perspective view of the stirrup member which supports the corrugated metal bellows.

The construction shown in Figs. 1, 2 and 3 is the simplest form and comprises a plate 1 of sheet metal which at diametrically opposed points is provided with outwardly extending ears 2 having openings therethrough for the passage of bolts. This plate is designed for attachment between an automobile radiator and the connection which leads therefrom to the engine, the same bolts which secure said connection being utilized to hold the plate 1 securely in place. Plate 1 is formed with central section 3 of circular form which is pressed to one side of the plane of the body of the plate, the inner side of the section 3 having an annular face 4 inclined at an angle to the plane of the plate as shown. A relatively large opening is made through this central circular section 3 in which the valve, later described, may seat.

A stirrup member of U-shape made from a length of strap metal is secured to the plate. Said member comprises a base 5 from the ends of which legs 6 are bent at right angles and each at its free end is formed with an annular inclined lip 7. The distance between the legs 6 is such that the lips 7 come snugly against diametrically opposed portions of the annular face 4 as best shown in Fig. 1. In such position they are permanently secured by soldering or brazing. A stop lug 8 is struck from each leg 6 and turned inwardly, being located a short distance from the free ends of the legs 6. An opening 9 is made through the base 5 midway between its ends.

A corrugated sheet metal bellows 10 having its ends closed and charged with a saturated vapor, sensitive to changes in temperature so that it expands or contracts readily with such changes is located upon the base 5 between the legs 6. The end of the expansible and contractible element 10 which bears against said base 5 is provided with a threaded stud 11 passing through the opening 9 on which a suitable locking washer and a nut 12 are placed to securely attach the thermostatic element. A stem 13 extends centrally from the opposite end of the thermostatic element 10, and at its free end is reduced in size and threaded to make the threaded stud 14. A valve 15 of sheet metal is placed over the stud 14 and secured in place by a lock washer and a nut 16. The valve 15 is formed with an annular inclined flange 15a so that when the expansible and contractible element 10 is contracted sufficiently, said flange 15a seats in the valve opening made through the plate 3 and completely closes said opening.

It is evident that the passage or opening through the plate 1 will be closed by the valve when the temperature to which the expansible and contractible element 10 is subjected is below a certain predetermined amount. With an increase of temperature above such point the element 10 expands and as a result the valve 15 moves away from the plate 1 opening the passage therethrough. The stop lugs 8 lie in the path of movement of the expansible bellows 10 and when the end thereof engages against said lugs further outward movement of the valve 15 is stopped. With the cooling of the water in the circulation system in which the bellows is installed and which results in contraction, the valve 15 moves towards closing position and when it approaches its completely closed position the annular flange 15a on the valve acts to properly guide and seat the valve in the opening made through the central section 3 of the plate 1.

This construction of thermostatic valve is very simple and economical to make and is one which, for smaller sizes of thermostatically operated valves, has proved very practical in all respects.

Figure 4:
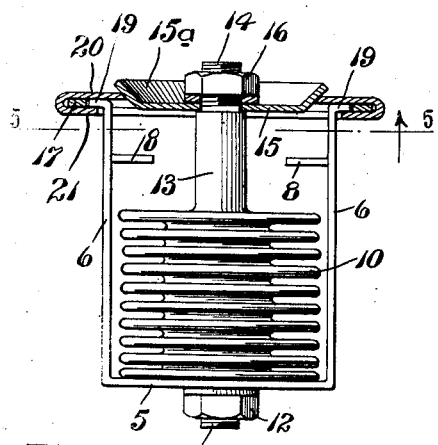
Fig. 4 is a view, similar to Fig. 1, of a slightly different form of construction.
Figure 5:
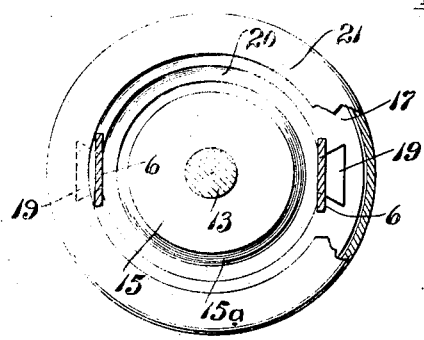
Fig. 5 is a horizontal section taken substantially on the plane of line 5—5 of Fig. 4, looking in the direction indicated.
Figure 6:
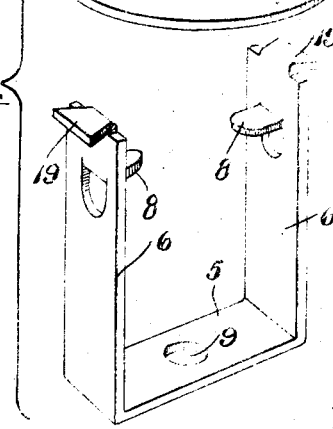
Fig. 6 is a perspective view of two of the elements which enter into the construction of the thermostatic valve shown in Fig. 4.

In Figs. 4 to 6 inclusive, a different form of structure is shown. The stirrup or U-shaped member which supports the expansible bellows is substantially the same as that shown in Fig. 1 except for the change made at the free ends of the legs 6, such change being necessitated by the different means of connection used for attaching it to the plate through which the opening or passage is made. A ring 17 of circular form with an opening therethrough larger than the diameter of the valve 15 is used at the inner side of which, and at diametrically opposed points, two dovetail notches or recesses 18 are cut. The free ends of the legs 6 are correspondingly formed with tongues 18 turned outwardly at right angles which are of a shape to fit in the recesses 18. The tongues 19 lie in the same plane with the ring 17. A plate 20 of sheet metal having a central opening in which the valve 15 may seat is placed over the ring 17 and the tongues 19 and its edge portions are spun inwardly, turning around the outer edges of the ring 17 and coming against the opposite side of the ring and said tongues 19 as indicated at 21 in Fig. 4. This makes a very secure and permanent connection of the supporting stirrup with the plate through which the valve opening is made. The action of the thermostatic valve is identical with that shown in Fig. 1.

In Figs. 7, 8 and 9 a still further form is shown, the same being very similar to that shown in Figs. 4, 5 and 6, except that the notches 18a made in the ring 17 are at the outer edges of the ring and not at the inner side. The notches 18a and the tongues 19a which seat in the same do not need to be of dovetail or equivalent locking form. The securing of the plate 20 to the ring with the consequent attachment of the supporting stirrup is identical with that described with reference to Figs. 4, 5 and 6. With this form of structure it is possible, with the same diameter of ring 17, to space the legs 6 a greater distance apart and use a larger diameter of bellows 10.

In Figs. 10 to 12 inclusive a modification of the structure shown in Fig. 4 is illustrated. A guide for the stem 13 is provided by forming a downwardly and inwardly pressed cross bar 22 integral with the ring 17 and making a guide 23 at its middle through which the stem 13 may freely pass. Also, said guide, by reason of its being positioned a distance inward from the plane of plate 20, serves as a stop to limit the expansion of the bellows 10. This results in an elimination of the stop lugs 8 from the legs 6 of the supporting stirrup and it is not necessary to provide the valve with an inclined seating flange such as indicated at 15a on the valve 15. The valve 24 shown in the structure is a flat plate of sheet metal larger than the opening through the plate 20. This structure shown in Figs. 10 to 12 inclusive is not a preferred form but is disclosed to illustrate the adaptability of the construction which I have devised so that a guide for the stem 13 may be supplied if it is deemed desirable.

The invention is simple, practical, durable and efficient. Simplicity and economy in manufacture is inherent in the constructions shown, particularly those shown in Figs. 1 to 9 inclusive. Various other forms embodying the invention may be produced and I accordingly do not wish to be limited to specific forms illustrated. The invention is defined in the appended claims and is to be considered comprehensive of all forms of structure coming within their scope.

I claim:

1. A device of the class described comprising a sheet metal plate having an opening therethrough, a supporting stirrup of U-shape attached to said plate at one side, the ends of the legs of said stirrup being secured to said plate one at each side of the opening, a thermostatically expansible and contractible corrugated sheet metal bellows permanently secured to the base of said stirrup and extending toward the plate, a stem extending from the end of the bellows through said opening in the plate, a valve secured to the end of the stem adapted to close the opening in the plate on contraction of the bellows, and stops carried by and extending inwardly from the legs of said stirrup between the bellows and said valve and terminating short of said stem.

2. A device of the class described comprising a plate of sheet metal having a circular opening therethrough, a stirrup made from a single length of flat metal bent into U-shape and connected to said plate at one side thereof, the ends of the legs of said stirrup being secured to the plate one at each side of the opening therethrough, a thermostatically expansible and contractible sheet metal bellows secured to the base of the stirrup and extending towards said plate, a stem extending from the bellows through the opening in the plate, and a valve of sheet metal having a continuous annular flange around the same inclined to the plane of said plate secured at the outer end of said stem, said flange automatically guiding the valve into closing position in said opening on contraction of the bellows.

3. A device of the class described comprising a plate of sheet metal having an opening therethrough, a stirrup made from a single length of flat metal bent into U-shape attached to said plate, the ends of the legs of said stirrup being secured to the plate at diametrically opposed sides of said opening, a thermostatically expansible and contractible sheet metal bellows secured to the base of said stirrup and extending towards said plate, a stop lug struck inwardly from each of the legs of the stirrup between the bellows and plate, a stem extending from the bellows through the opening in the plate and a valve attached to the outer end of the stem adapted to close said opening in the plate on contraction of the bellows.

4. In a device of the class described, a ring of flat metal having diametrically opposed notches therein, a stirrup of U-shape having tongues at its ends seated in said notches, a plate of sheet metal having an opening therethrough lying against one side of said ring and tongues and turning around the outer edge of the ring and against the under side thereof and the under sides of said tongues, a thermostatically expansible and contractible corrugated sheet metal bellows secured to the base of said stirrup and extending toward said plate, a stem connected to the opposite end of the bellows, and a valve secured to the outer end of the stem to close said opening on contraction of the bellows.

5. A construction containing the elements in combination defined in claim 4, combined with stops attached to the legs of said stirrup and extending inwardly therefrom and located between the bellows and said plate.

6. In a device of the class described, a circular ring having diametrically opposed recesses therein, a stirrup of U-shape having tongues at the ends of the legs thereof seated in said recesses, a plate of sheet metal having a central opening therethrough connected with said ring and tongues and securing said rings, tongues and plate together, a thermostatically expansible and contractible element carried by the stirrup, a valve stem extending from said element through the opening in the plate, a valve attached to the end of the stem to close said opening on contraction of said element and means for limiting the outward movement of said valve.

7. Temperature-controlled apparatus comprising a generally U-shaped open cage, a metallic bellows rigidly connected with the cage at one end, a plate connected to the legs of the cage beyond the bellows and having an opening therein in line with the bellows, a valve connected with the bellows for closing the opening in said plate in the contraction of the bellows, and stops formed integral with the legs of the cage on one side of the valve and terminating short of the stem to limit the movement of the valve away from the plate upon the expansion of the bellows.

8. Temperature-controlled apparatus comprising a supporting cage, a bellows fixedly connected to the cage at one end, a plate fixedly connected to the cage opposite the free end of the bellows and having a valve opening therein in line with the bellows, a stem projecting from the free end of the bellows through said opening, with the outer end of the stem reduced and threaded, a valve disc for opening and closing said opening and secured to the reduced end of said stem, and stop means carried by the cage at one side of the plate and terminating short of the stem for determining the travel of the valve between closed and full open position.

9. A device of the character described comprising a plate having an opening therein, a U-shaped stirrup at one side of said plate, the ends of the legs of the stirrup being connected to the plate at diametrically opposed sides of the opening, a bellows mounted within the stirrup on the base thereof, a stem projecting through the opening from the free end of said bellows, and a valve member secured to the outer end of said stem for opening and closing said opening on the expansion and contraction of the bellows, said valve member being in the form of a sheet metal disc with its outer edge turned outward from the plate to provide an inclined marginal flange to co-operate with the edge of the opening in the plate to guide and center the valve as it comes to seat in said opening.

In testimony whereof I affix my signature.

EDGAR J. LEACH.